United States Patent
Umeda et al.

[11] Patent Number: 5,796,279
[45] Date of Patent: *Aug. 18, 1998

[54] DC APPLICATION CIRCUIT WITH SUPPRESSED DC MAGNETIZATION

[75] Inventors: Kazuhiro Umeda; Syuzi Ichikawa, both of Tokyo, Japan

[73] Assignee: Tokyo Tsuki Co., Ltd., Tokyo, Japan

[*] Notice: The term of this patent shall not extend beyond the expiration date of Pat. No. 5,414,309.

[21] Appl. No.: 433,453

[22] PCT Filed: Oct. 18, 1994

[86] PCT No.: PCT/JP94/01746

§ 371 Date: May 9, 1995

§ 102(e) Date: May 9, 1995

[87] PCT Pub. No.: WO95/11549

PCT Pub. Date: Apr. 27, 1995

[30] Foreign Application Priority Data

| Oct. 19, 1993 | [JP] | Japan | 5-260836 |
| Mar. 11, 1994 | [JP] | Japan | 6-001985 |
| May 10, 1994 | [JP] | Japan | 6-096780 |

[51] Int. Cl.$^6$ .......................................... H03K 3/35
[52] U.S. Cl. .......................... 327/110; 327/108; 327/190; 327/312; 327/328; 327/482; 327/538; 327/308
[58] Field of Search .......................... 327/108, 109, 327/110, 190, 308, 310, 311, 312, 313, 328, 481, 482, 362, 538, 307

[56] References Cited

FOREIGN PATENT DOCUMENTS

| 58-025755 | 2/1983 | Japan . |
| 61-23453 | 1/1986 | Japan . |
| 61-77445 | 4/1986 | Japan . |
| 62-216457 | 9/1987 | Japan . |
| 1093245 | 4/1989 | Japan . |
| 1143528 | 6/1989 | Japan . |
| 1270403 | 10/1989 | Japan . |
| 2087753 | 3/1990 | Japan . |
| 2-084484 | 6/1990 | Japan . |

*Primary Examiner*—Terry Cunningham
*Attorney, Agent, or Firm*—Loeb & Loeb LLP

[57] ABSTRACT

To a current mirror circuit or a voltage regulator are coupled a primary winding of a transformer ($T_3$ or $T_4$) or a choke coil ($L_2$ or $L_3$). Transistors ($Q_1$ or $Q_2$) making up a current mirror circuit or the voltage regulator are alternatingly bypassed by a bypass circuit constituted of a capacitor ($C_2$) and other elements. A DC magnetization which may be otherwise caused in a core or a yoke of the transformer ($T_3$) or the choke coil ($L_2$) is canceled by allowing direct currents to flow in opposite directions to each other through the primary winding of the transformer ($T_4$) or through the choke coil ($L_2$). Alternatively, the DC magnetization which may be otherwise caused in the core or the yoke of the transformer ($T_4$) or the choke coil ($L_3$) is significantly suppressed by restricting the direct currents flowing through the primary winding of the transformer ($T_4$) or the choke coil ($L_3$). This results in no necessity to provide a gap in a magnetic circuit, ensuring the reduction in size of the entire circuit configuration including the transformer ($T_3$) as well as improved characteristics.

11 Claims, 8 Drawing Sheets

Configuration of First Embodiment $T_3$ = transformer for circuit of invention
$R_1$ to $R_3$ = resistors
$Q_1$ and $Q_2$ = transistors
$C_2$ = bypass capacitor

Configuration of First Embodiment

$T_3$ = transformer for circuit of invention
$R_1$ to $R_3$ = resistors
$Q_1$ and $Q_2$ = transistors
$C_2$ = bypass capacitor

Characteristics of First Embodiment (Input = 0 dB)

Configuration of Second Embodiment

$T_4$ = transformer for circuit of invention

Configuration of Third Embodiment

$T_4$ = transformer for circuit of invention

Configuration of Fourth Embodiment $Q_2$=2SD1162 (Dalington)
$R_1$=47kΩ
$R_2$=47kΩ
$R_3$=100Ω
$C_2$=10μF
$C_3$= 1μF
$C_4$=0.01μF
T4=600Ω:600Ω

Configuration of Fifth Embodiment $Q_2$=2SD1162 (Dalington)
$R_1$=47kΩ
$R_3$=100Ω
$C_2$=10μF
$C_3$= 1μF
$C_4$=0.01μF
T4=600Ω:600Ω

Configuration of Sixth Embodiment

$Q_2$=2SC3298
$R_1$=47kΩ
$R_3$=100Ω
$C_2$=10μF
$C_3$= 1μF
T4=600Ω:600Ω

Configuration of Seventh Embodiment

$L_2$ = choke ciol for circuit of invention

Configuration of Eighth Embodiment $L_3$ = choke ciol for circuit of invention

Configuration of Ninth Embodiment $L_3$ = choke ciol for circuit of invention

Configuration of Tenth Embodiment

$Q_2$=2SD1162(Darlington)
$R_1$=47kΩ
$R_2$=47kΩ
$R_3$=100Ω
$C_2$=10μF
$C_3$= 1μF
$C_4$=0.01μF
$L_3$=600Ω

Configuration of Eleventh Embodiment

$Q_2$=2SD1162 (Darlington)
$R_1$=47kΩ
$R_3$=100Ω
$C_2$=10μF
$C_3$= 1μF
$C_4$=0.01μF
$L_3$=600Ω

Configuration of Twelfth Embodiment

$Q_2$=2SC3298
$R_1$=47kΩ
$R_3$=100Ω
$C_2$=10μF
$C_3$= 1μF
$L_3$=600Ω

Configuration of First Prior Art Example

$L_1$ = choke coil (large-sized)
$C_1$ = DC cutting capacitor
$T_1$ = conventional transformer
$Z$ = load impedance Configuration of Second Prior Art Example $T_2$ = DC applicable-type transformer (extra-large-sized)

Characteristics of Second Embodiment (Input = 0 dB)

5,796,279

1

DC APPLICATION CIRCUIT WITH SUPPRESSED DC MAGNETIZATION

This application is filed under 35 U.S.C. § 371 as a national stage application of PCT/JP94/01746, filed Oct.18, 1994.

TECHNICAL FIELD

The present invention relates to a DC application circuit for applying a direct current to a transformer or a choke coil for use in various transmission circuits.

BACKGROUND ART

In order to extract AC components from signals containing DC components and AC components, use has been hitherto made of a transformer, for example, as shown in FIG. 14. In this diagram, a choke coil $L_1$ is connected in parallel to the input side of a transformer $T_1$ via a direct current isolation capacitor $C_1$. Therefore, when this circuit receives DC/AC superimposed signals, only the AC components are applied to the transformer $T_1$. However, this configuration entails problems that the choke coil $L_1$ tends to be large-sized resulting in increased size of the entire circuit or that the use of the choke coil $L_1$ may lead to raised component costs.

To solve such problems, use as a transformer may be made of a DC applicable transformer $T_2$, for example, as shown in FIG. 15. The DC applicable-type transformer $T_2$ includes a large gap in its magnetic path to eliminate the influence of a DC magnetization, thereby allowing application of the DC components.

Disadvantageously, the configuration as shown in FIG. 15 needs to have enlarged external dimensions due to the provision of the gap to eliminate the influence of the DC magnetization. For instance, the number of turns of the transformer $T_2$ is 1600 turns on both the primary side and the secondary side, with a core size of 35 mm (so-called EI-35). The use of such a large-sized transformer $T_2$ would result in an attenuation value as low as 3 dB at 100 Hz as seen in FIG. 16.

DISCLOSURE OF THE INVENTION

The present invention was conceived to overcome the above problems. It is therefore an object of the present invention to enable a direct current to be applied to a winding of a transformer or a choke coil without increasing the size of a circuit configuration, as well as to improve the characteristics.

In order to achieve the object, a circuit for applying a direct current to a winding according to the present invention comprises the winding for receiving a DC/AC superimposed signal consisting of DC components and AC components superimposed on each other, and a DC magnetization prevention circuit for preventing a DC magnetization caused in a magnetic member of the winding due to the DC components flowing therethrough.

In the present invention, the DC magnetization, which may be caused by the DC components in the DC/AC superimposed signals supplied to the winding, is reduced or eliminated by the DC magnetization prevention circuit. Thus, there is no need to provide a gap to compensate for influence of the DC magnetization, which will result in no increase in the external dimensions and no degradation in the characteristics. Additionally, upon the evaluation of the characteristics, the characteristics do not vary largely depending on whether inputs are DC/AC superimposed signals or have only AC components, thus facilitating the evaluation and testing. The present invention may be widely applied to general transmission circuits.

The first configuration of the DC magnetization prevention circuit of the present invention is characterized in that it restrains the direction of current of the DC components through the winding so that the DC components flow in the opposite direction with a boundary defined by a center tap placed on the winding in order to input the DC/AC superimposed signal. In the case of employing the first configuration as the DC magnetization prevention circuit, the DC components flow in opposite directions through the winding from the boundary defined by the center tap, whereby the influences of the magnetization due to the DC components can be offset by each other, accomplishing a preferable prevention of the DC magnetization in the magnetic member.

This configuration may be implemented by a current mirror circuit having a diode side circuit connected to one end of the winding and a transistor side circuit connected to the other end thereof, and a bypass circuit for bypassing the AC components, among the inputs to the winding, to the exterior of the current mirror circuit so that only the DC components are input to the current mirror circuit. Such implementation will allow the DC components among the DC/AC superimposed signals fed to the winding to be led into the current mirror circuit. Through the bypass circuit, the AC components are bypassed via a part of the winding to the exterior of the current mirror circuit. Accordingly, a part of the winding through which AC components flow serves its original function for the transformer or the choke coil, while simultaneously the DC components separate from the center tap of the winding into two direction (into the diode side circuit and the transistor side circuit of the current mirror circuit), with the result that the influences of the magnetization due to the DC components are offset by each other.

The second configuration of the DC magnetization prevention circuit is characterized in that it bypasses almost all of the DC components to be input to the winding, thereby reducing the DC components flowing through the winding to such a degree that they can be ignored. With such a configuration, almost all of the DC components to be input to the winding are bypassed to the exterior of the winding by virtue of the DC magnetization prevention circuit. As a result, the DC components flowing through the winding are reduced to such a degree that they can be ignored, and hence little or no DC magnetization takes place. Thus, without providing the center tap on the winding, the same DC magnetization preventing function as the configuration of first configuration can be realized.

This configuration can be implemented by a current mirror circuit having a diode side circuit connected to one end of the winding and a transistor side circuit connected to the other end thereof, and a current divider circuit for dividing input current into two parts and also for supplying one of them to the diode side circuit of the current mirror circuit and another one of then to the transistor side circuit thereof so that the direct current flowing to the diode side circuit of the current mirror circuit is sufficiently smaller in value than the direct current flowing to the transistor side circuit thereof, and a bypass circuit for alternatingly bypassing the diode side circuit of the current mirror circuit.

The DC components, among the DC/AC superimposed signals input to the winding, are branched by the current divider circuit into the diode side circuit and the transistor side circuit of the current mirror circuit. At that time, the shunt circuit controls or regulates the flow of the direct current so that the direct current flowing into the diode side circuit of the current mirror circuit is sufficiently smaller in value than the direct current flowing into the transistor side circuit thereof. Therefore, the DC components flowing into the diode side circuit of the current mirror circuit and hence into the winding connected thereto become minute. The bypass circuit serves to bypass the diode side circuit of the current mirror circuit for an alternating current. This will allow the characteristics viewed from the input side to coincide with the characteristics of the winding. Moreover, the shunt circuit can be implemented by the resistors, and the appropriate setting of the values of the resistors will ensure a preferred implementation of the above function. That is, the shunt circuit includes a resistor connected to the diode side circuit and a resistor connected to the transistor side circuit of the current mirror circuit, and the value of the resistor connected to the diode side circuit may be sufficiently large for the value of the resistor connected to the transistor side circuit to be ignored.

Alternatively, the second configuration of the DC magnetization prevention circuit of the present invention is characterized by a transistor connected in parallel to the winding, a biasing circuit, connected in series to the winding, for biasing the transistor, and a bypass circuit for bypassing the AC components flowing through the winding so that an alternating current does not flow through the biasing circuit. The DC/AC superimposed signals input to the winding are supplied on one hand to the transistor and on the other hand to the winding. The bias circuit connected in series to the winding is alternatingly bypassed by the bypass circuit so that the AC impedance of the transistor has a large value. Furthermore, the value of the DC components flowing into the biasing circuit via the winding results in a value determined by the current amplification factor of the transistor, and hence in a sufficiently small value compared with the value of the DC components flowing into the transistor. Thus, in this configuration, the DC components flowing into the winding becomes very minute. Further, the implementation of the transistor by Darlington connection will ensure a circuit having a greater current driving ability.

The bias circuit may consist of a plurality of resistors connected in series for supplying a bias voltage from a connection point thereof. This will allow the transistor bias circuit to act as a voltage regulator, ensuring a regulated action. Further, by constituting a low-pass filter using the capacitors of the bypass circuit and the resistors of the biasing circuit, the leakage of the AC components into the transistor can be reduced. Use of this low-pass filter will allow the omission of some of the resistors and reduction in the generation of heat.

The present invention is characterized in that the winding is a primary winding of the transformer or a choke coil. This means that the present invention is applicable to not only the case where the winding is the primary winding of the transformer but also to the case where it is the choke coil. In this manner, the present invention has a very wide range of application.

BRIEF DESCRIPTION OF THE INVENTION

Figure 1:
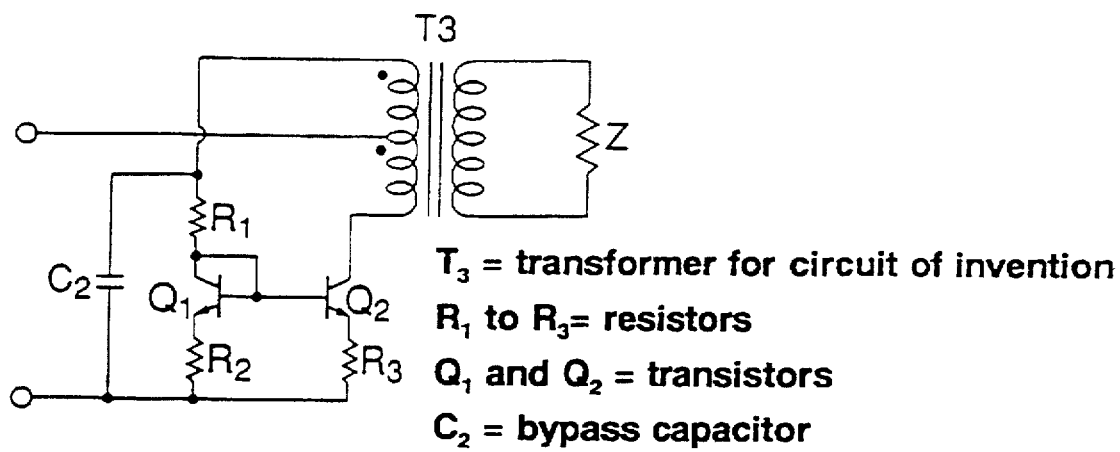
FIG. 1 is a circuit diagram showing a configuration of a circuit according to the first embodiment of the present invention.

In the diagrams, $T_3$ and $T_4$ denote a transformer. A transistor is designated at $Q_1$ and $Q_2$, and a capacitor is designated at $C_2$ to $C_4$. $L_2$ and $L_3$ represent a choke coil, and Z represents a load impedance. It is to be noted in the diagrams that the same elements are indicated by the same reference numerals.

BEST MODE FOR CARRYING OUT THE INVENTION

A preferred embodiment of the present invention will now be described with reference to the accompanying drawings.

Referring first to FIG. 1, there is shown a configuration of a circuit according to the first embodiment of the present invention. In the shown circuit, use is made of a transformer $T_3$ with an additional primary winding channel. A DC/AC superimposed signal is provided as an input to a center tap of the transformer $T_3$.

Through a resistor $R_1$, one end of a primary winding of the transformer $T_3$ is connected to a collector of a transistor $Q_1$. The other end of the primary winding is coupled to a collector of a transistor $Q_2$. A short circuit is established between the base and the collector of the transistor $Q_1$ so that the transistor $Q_1$ functions as a diode. Emitters of the transistors $Q_1$ and $Q_2$ are connected to an input terminal via resistors $R_2$ and $R_3$, respectively. Bases of the transistors $Q_1$ and $Q_2$ are coupled with each other so that a current mirror circuit is made up of the transistors $Q_1$ and $Q_2$. In addition, the resistor $R_1$ is located between the one end of the winding and the transistor $Q_1$, and a capacitor $C_2$ bypasses the resistor $R_1$, transistor $Q_1$ and resistor $R_2$.

When the thus configured circuit receives the DC/AC superimposed signal, DC components thereof are led into a current mirror circuit through the primary winding of the transformer $T_3$. More specifically, a direct current fed from the center tap is led via a part (upper side of the diagram) of the primary winding into the transistor $Q_1$ of the current mirror circuit, while simultaneously a direct current having the same value as the above (when a mirror ratio is 1) is led via the other part (lower side of the diagram) of the primary winding into the transistor $Q_2$. In this case no AC components flow into the transistor $Q_1$ since it is bypassed by the bypass capacitor $C_2$ due to the presence of the resistor $R_1$. As a result, DC magnetization of a core or a yoke (not shown) attendant on the supply of the DC current components into the primary winding of the transformer $T_3$ will be canceled because flow of the DC current components on one side of the center tap on the primary winding is opposite in direction to that on the other side. Thus, there is no need to provide a gap in the core or the yoke in consideration of the DC magnetization, thereby preventing the transformer $T_3$ from increasing in size. It is to be appreciated that the lower part in the diagram of the primary winding of the transformer $T_3$ (the part on the side of the transistor $Q_2$ of the current mirror circuit) does not function as an original primary winding of the transformer since no AC components flow therethrough. Allowed to function as the original primary winding of the transformer is the upper part in the diagram (the part on the side of the transistor $Q_1$ of the current mirror).

In order to clarify the effect of this embodiment, comparisons will now be made between this embodiment and the above-described second prior art example according to EI-35 specification. In the case where this embodiment is used for the same application as the thus configured second prior art example, 800 turns in total on the primary side and 400 turns on the secondary side will be sufficient for the number of turns of the transformer $T_3$, with a core size of 14 mm (so-called EI-14). Furthermore, this circuit can be constituted of general-purpose elements. By way of example, the transistor $Q_1$ and $Q_2$ can be transistors such as 2SC1815, and the resistors $R_1$, $R_2$, and $R_3$ and the capacitor $C_2$ can be implemented by elements having general specifications and values such as 150 Ω and 100 μF, respectively.

Figure 2:
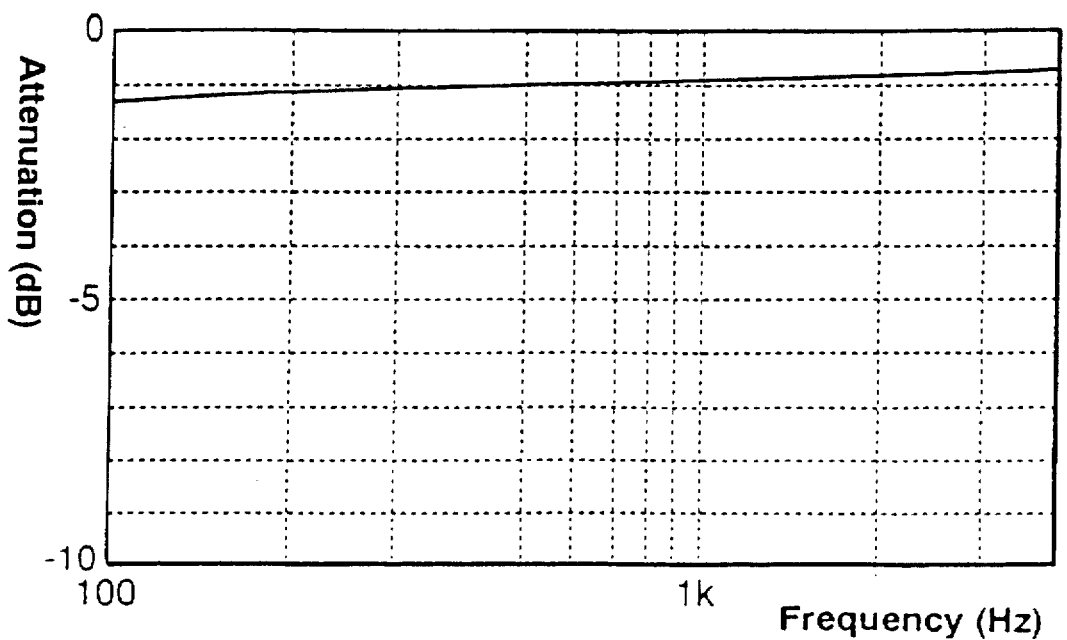
FIG. 2 is a graphical representation showing characteristics of this embodiment.

Moreover, this embodiment ensures remarkably improved characteristics compared with the second prior art example set forth hereinabove. As is seen in FIG. 2, an attenuation value at, for instance, 100 Hz results in approximately −1 dB, and attenuation characteristics describe a substantially flat curve from lower frequencies to higher frequencies. In the characteristics of this circuit, there is very little difference between the case of inputting the DC/AC superimposed signal and the case of inputting only the AC components, which will facilitate the valuation and testing of the characteristics.

Figure 3:
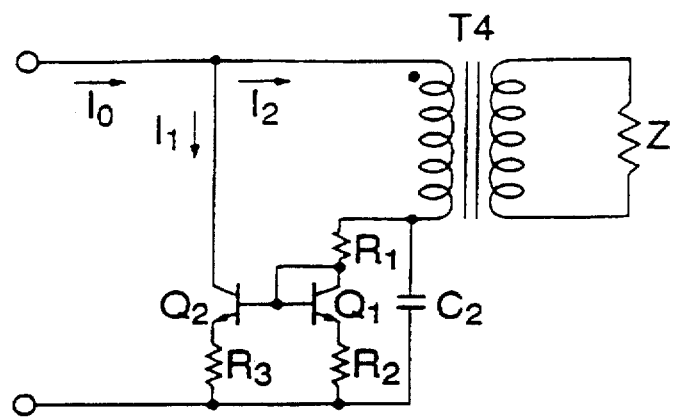
FIG. 3 is a circuit diagram showing a configuration of a circuit according to the second embodiment of the present invention.

Referring to FIG. 3, there is depicted a configuration of a circuit according to the second embodiment of the present invention. In the shown circuit, use is made of a transformer $T_4$ reduced in size compared with the conventional transformer, for reasons which will be described later. The DC/AC superimposed signal is input to the transformer $T_4$ having, for instance, an input impedance of 600 Ω and an output impedance of 600 Ω.

Firstly, this embodiment differs from the first embodiment in the connection of the transformer to the current mirror circuit. More specifically, although the upper and lower terminals of the transformer $T_3$ were coupled to the diode side and the transistor side, respectively, of the current mirror circuit in the first embodiment, the lower and upper terminals of the transformer $Q_4$ are coupled to the diode side and the transistor side, respectively, in this embodiment. Secondly, this embodiment differs from the first embodiment in that the transformer $T_4$ used is not provided with the center tap, and that the DC/AC superimposed signal is input to the upper terminal of the transformer $T_4$.

When the thus configured circuit receives the DC/AC superimposed signal, DC components $I_0$ thereof are divided into a direct current $I_1$ to the collector of the transistor $Q_2$ and DC components $I_2$ of a primary current to the transformer $T_4$. The current $I_2$ is led into the current mirror circuit via the primary winding of the transformer $T_4$. The current $I_2$ causes a DC voltage $R_2I_2$ between ends of the resistor $R_2$, allowing the same voltage to occur between ends of the resistor $R_3$. A ratio of the current $I_1$ to the current $I_2$ is therefore determined by values of the resistors $R_1$ to $R_3$.

For instance, let the resistors $R_1$ and $R_2$ be 10 KΩ, and the resistor $R_3$ be 10 Ω. When a current of 100 mA flows through the resistor $R_3$, a voltage of 100 mA×10 Ω=1V will appear between ends of the resistor $R_3$. At that time, the ends of the resistor $R_2$ are also subjected to the same voltage of 1V, and hence the value of the current flowing through the resistor $R_2$ is 1V/10 KΩ=0.1 mA. In other words, when the circuit of this embodiment receives the DC/AC superimposed signal having DC components $I_0$=100 mA, an extremely large direct current (about 100 mA), compared with the direct current of 0.1 mA flowing through the resistor $R_2$, will flow into the transistor $Q_1$ and the resistor $R_3$. This means that almost all of the DC components $I_0$ of the input signal flow into the transistor $Q_1$ and the resistor $R_3$, but a very minute DC current is allowed to flow through the primary winding of the transformer $T_4$. As a result, the DC magnetization of the core or the yoke which might be otherwise caused by the supply of the DC components into the primary winding of the transformer $T_4$ can be ignored due to the extremely minute DC components flowing therethrough. This will result in no need to provide a gap in consideration of the DC magnetization, whereby it is possible to prevent the transformer $T_4$ from increasing in size. In addition, the AC components of the input DC/AC superimposed signal flow into the primary winding of the transformer $T_4$ since a collector-emitter impedance of the transistor $Q_1$ is infinite. These AC components are bypassed by the capacitor $C_2$. Thus, between the input terminals of this circuit, there will appear characteristics of the transformer $T_4$.

In this embodiment, as long as the number of turns of the transformer $t_4$ is 400 turns on both the primary side and the secondary side, the core size may be 14 mm (so-called EI-14). Additionally, this circuit can be made up of general-purpose elements. It is to be appreciated that, for instance, the transistor $Q_1$ and $Q_2$ can be transistors such as 2SC1815, and the resistors $R_1$, $R_2$, and $R_3$ and the capacitor $C_2$ can be implemented by elements having general specifications and values.

In the same manner as the first embodiment, this embodiment also ensures remarkably improved characteristics compared with the second prior art example. That is, the same characteristics as seen in FIG. 2 can be obtained. Also, like the first embodiment, the circuit characteristics hardly vary between the case of inputting the DC/AC superimposed signal and the case of inputting only the AC components.

Figure 4:
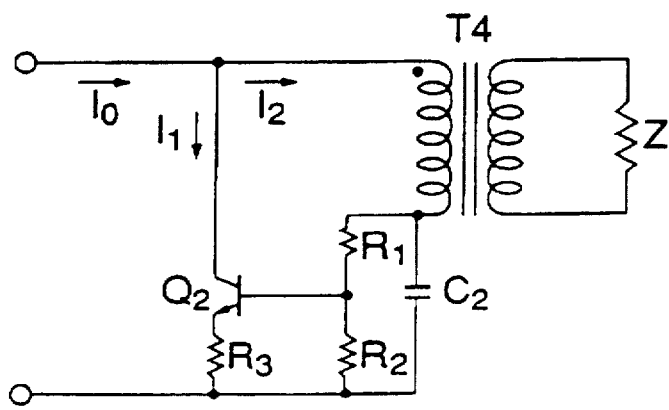
FIG. 4 is a circuit diagram showing a configuration of a circuit according to the third embodiment of the present invention.

Referring to FIG. 4, there is illustrated a configuration of a circuit according to the third embodiment of the present invention. Also in the shown circuit, use is made of the same transformer $T_4$ as in the second embodiment.

This embodiment differs from the second embodiment in that it includes a voltage regulator in place of the current mirror circuit. More specifically, with the elimination of the transistor $Q_1$ having the short-circuited base-collector, a biasing circuit for the transistor $Q_2$ is made up of the resistors $R_1$ and $R_2$. The resistors $R_1$ and $R_2$ are bypassed by the capacitor $C_2$ in an alternating manner, and hence the biasing by the resistors $R_1$ and $R_2$ will result in a DC biasing. The transistor $Q_2$ and the biasing circuit (including the resistors $R_1$ and $R_2$) constitute the voltage regulator, whereby collector-emitter impedance of the transistor $Q_2$ results in an alternatingly high impedance. The transistor $Q_2$ can be 2SC3298, for instance.

The DC components $I_0$ of the DC/AC superimposed signal are divided into the direct current $I_1$ to the collector of the transistor $Q_2$ and the DC component $I_2$ of the primary current of the transformer $T_4$, the current $I_2$ being led via the primary winding of the transformer $T_4$ into the biasing circuit. The base of the transistor $Q_2$ is biased by virtue of the current $I_2$, whereby the base-emitter voltage of the transistor $Q_2$ results in a constant voltage, to allow the direct current $I_1$ having a value in accordance with this voltage to flow into the collector of the transistor $Q_2$. The ratio of the current $I_1$ to the current $I_2$ depends on the current amplification factor of the transistor $Q_2$ and the design of the biasing circuit. Thus, the current $I_1$ results in an extremely large current compared with the current $I_2$.

Consequently, in the same manner as the second embodiment, the DC components $I_0$ of the input signal hardly flow into the primary winding of the transformer $T_4$. Therefore, similarly, the need to provide a gap in consideration of the DC magnetization is eliminated and the transformer $T_4$ is prevented from increasing in size.

This embodiment also realizes a transformer $T_4$ reduced in size to the same degree as the second embodiment, while ensuring characteristics equivalent thereto. In addition, the number of the transistors can be decreased by one, contributing to not only the simplification of the circuit configuration but also the curtailment of the production costs.

Figure 5:
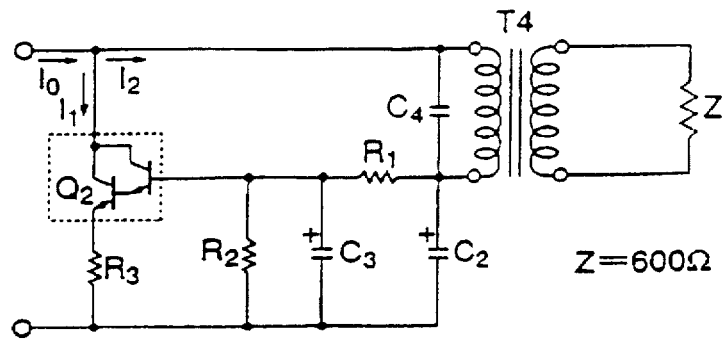
FIG. 5 is a circuit diagram showing a configuration of a circuit according to the fourth embodiment of the present invention.

Referring to FIG. 5, there is shown a configuration of a DC application circuit according to the fourth embodiment of the present invention. This embodiment differs from the third embodiment in that it employs Darlington connection including a couple of transistors (for instance, 2SD1162s) as the transistor $Q_2$. Correspondingly, a capacitor $C_4$ is provided in parallel with the primary winding of the transformer $T_4$. A capacitor $C_3$ is further provided in parallel with the resistor $R_2$. The Darlington connection of the transistor $Q_2$ will ensure its increased current drive ability. The addition of the capacitor $C_3$ allows a low-pass filter to be constituted of the resistor $R_1$, and the capacitors $C_2$ and $C_3$, thereby reducing leakage of the AC components to the transistor $Q_2$ side.

Figure 6:
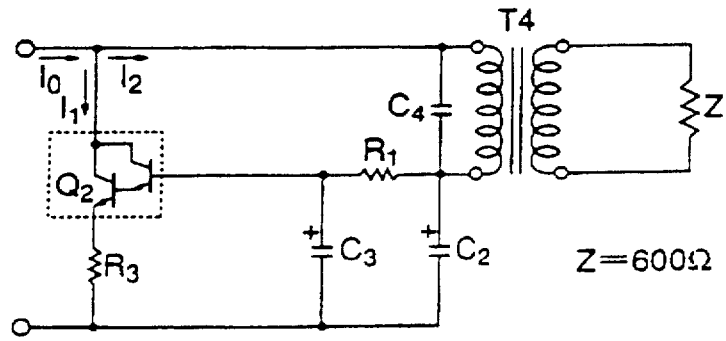
FIG. 6 is a circuit diagram showing a configuration of a circuit according to the fifth embodiment of the present invention.

Referring to FIG. 6, there is depicted a configuration of a DC application circuit according to the fifth embodiment of the present invention. This embodiment differs from the fourth embodiment in that the resistor $R_2$ is eliminated therefrom. The elimination of the resistor $R_2$ results in no generation of heat by the resistor $R_2$, realizing a circuit generating less heat.

Figure 7:
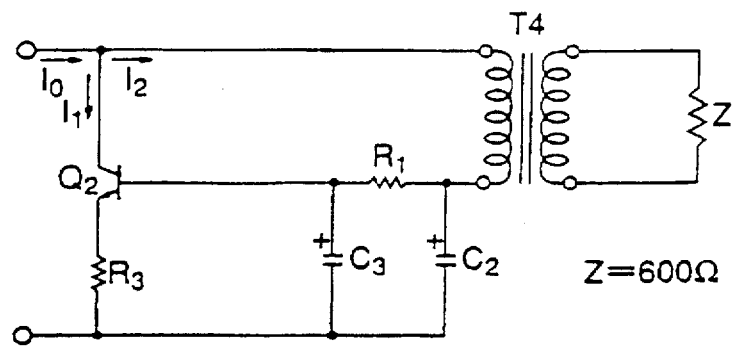
FIG. 7 is a circuit diagram showing a configuration of a circuit according to the sixth embodiment of the present invention.
Figure 8:
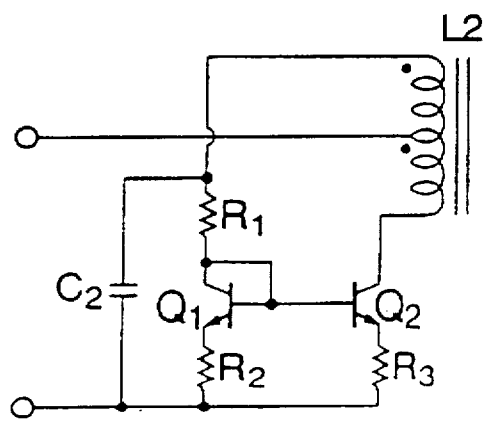
FIG. 8 is a circuit diagram showing a configuration of a circuit according to the seventh embodiment of the present invention.
Figure 9:
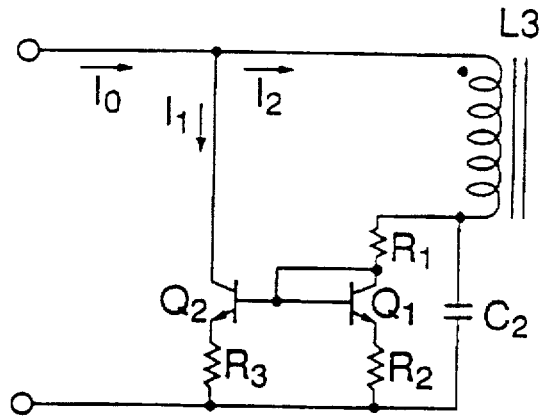
FIG. 9 is a circuit diagram showing a configuration of a circuit according to the eighth embodiment of the present invention.
Figure 10:
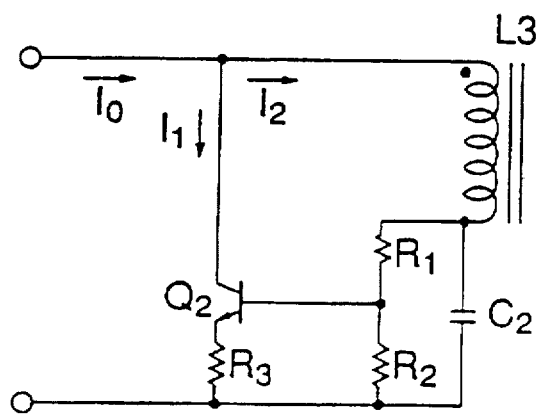
FIG. 10 is a circuit diagram showing a configuration of a circuit according to the ninth embodiment of the present invention.
Figure 11:
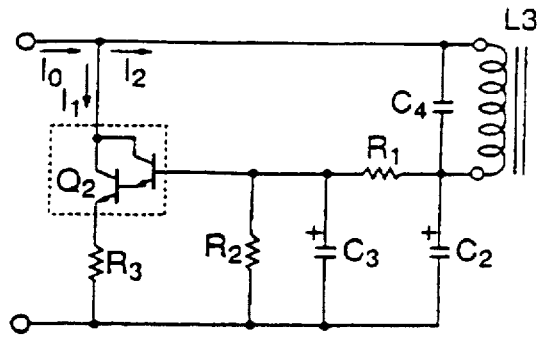
FIG. 11 is a circuit diagram showing a configuration of a circuit according to the tenth embodiment of the present invention.
Figure 12:
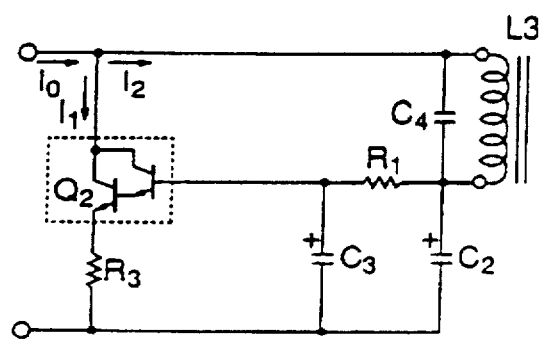
FIG. 12 is a circuit diagram showing a configuration of a circuit according to the eleventh embodiment of the present invention.
Figure 13:
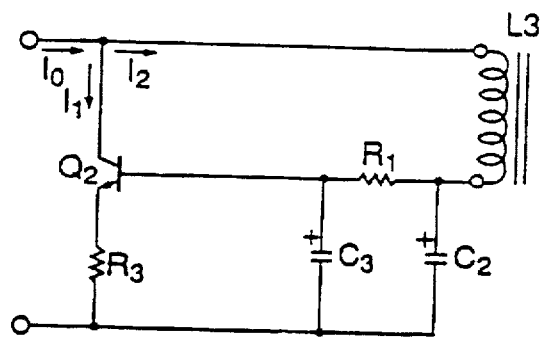
FIG. 13 is a circuit diagram showing a configuration of a circuit according to the twelfth embodiment of the present invention.
Figure 14:
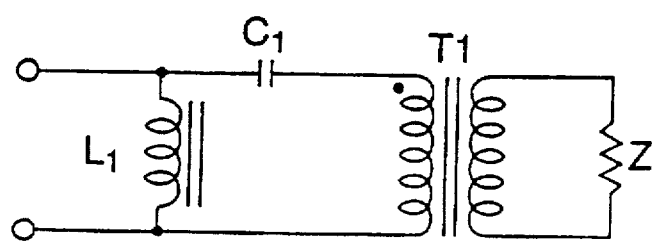
FIG. 14 is a circuit diagram showing a configuration of a circuit according to the first prior art example.
Figure 15:
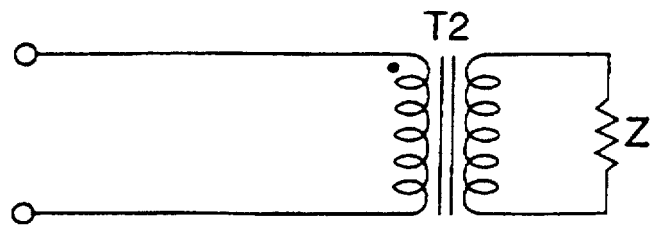
FIG. 15 is a circuit diagram showing a configuration of a circuit according to the second prior art example.
Figure 16:
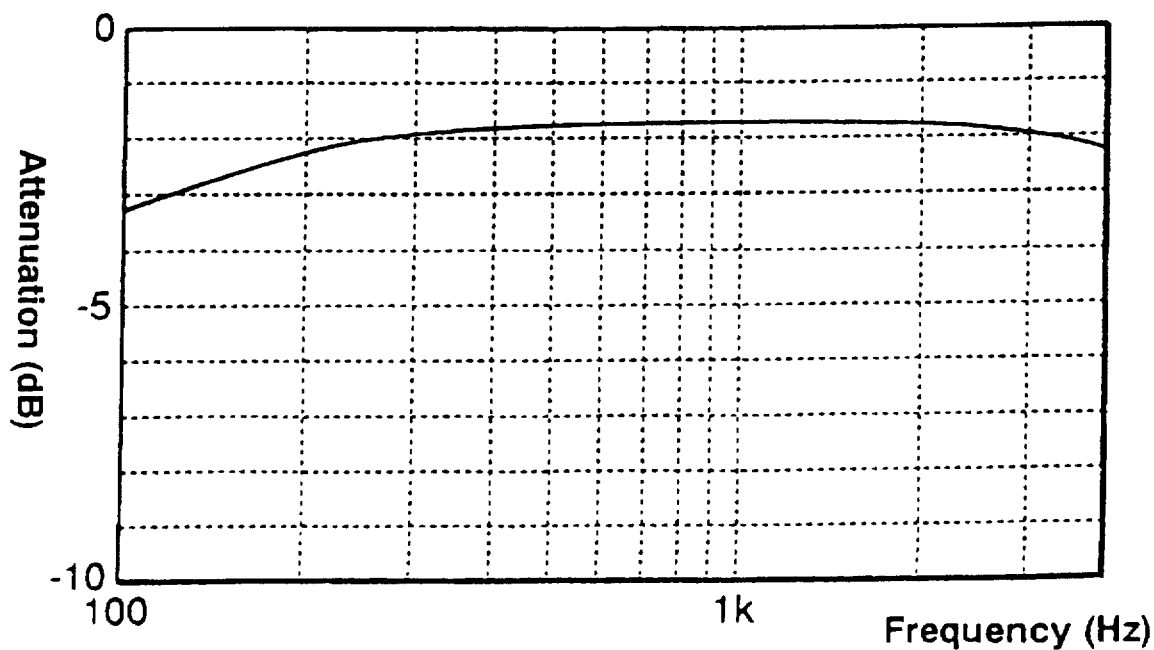
FIG. 16 is a graphical representation showing characteristics of this prior art example.

Referring to FIG. 7, there is illustrated a configuration of a DC application circuit according to the sixth embodiment of the present invention. This embodiment differs from the third embodiment in that the capacitor $C_3$ is provided without the resistor $R_2$. Elimination of the resistor $R_2$ realizes a circuit generating less heat, and the addition of the capacitor $C_3$ ensures a reduction in leakage of the AC components into the transistor $Q_2$ side.

Referring finally to FIGS. 8 to 13, there are shown configurations of DC application circuits, respectively, according to the seventh to twelfth embodiments of the present invention. The shown circuits differ from the first to sixth embodiments in that they are a circuits for applying direct current to a choke coil $L_2$ or $L_3$. These embodiments also ensure the effects such as reduction in size.

It is to be noted that in the above description the mirror ratio of the current mirror circuit was 1, which is associated with the fact the center tap halves the number of windings in the first and seventh embodiments. However, in the execution of the present invention, mirror ratios other than 1 may be designed. For instance, there may be employed the transistors $Q_1$ and $Q_2$ having proper emitter areas, in accordance with the setting of the position of the center tap for the first and seventh embodiments, and so as to allow a minute direct current to flow through the primary winding of the transistor $T_4$ for the second and eighth embodiments. However, in view of reducing the influence of the DC magnetization as well as providing an inexpensive configuration, it is most preferable to employ the mirror ratio of 1 in the first and seventh embodiments and to employ as large a mirror ratio as possible in the other embodiments using the current mirror circuit. Moreover, the value of the resistor $R_1$ may be set in accordance with the DC value. Also, the diode-connected transistor $Q_1$ may be replaced with a diode.

INDUSTRIAL APPLICABILITY

The present invention is applicable to a facsimile or various other transmission devices. More specifically, the present invention is widely applicable to transformers or inductors for use in a circuit processing a superimposed signal of a DC signal and an AC signal.

What is claimed is:

1. A circuit comprising:

a winding having a magnetic member;

input means for conducting an electrical current having an AC component and a DC component, said input means being connected to said winding; and a DC magnetization prevention circuit unit connected to said winding and said input means for preventing DC magnetization of said magnetic member due to the DC component of the electrical current, wherein: said winding has two winding halves and a center tap between said winding halves; said input means are connected for delivering the electrical current to said center tap; and said DC magnetization prevention circuit unit is operative for dividing the DC component into two equal portions which flow in opposite directions in the two winding halves.

2. The circuit of claim 1, wherein said DC magnetization prevention circuit unit includes:

a current mirror circuit having a diode side circuit connected to one end of said winding and a transistor side circuit connected to the other end of said winding; and a bypass circuit for bypassing the AC component to the exterior of said current mirror circuit so that only the DC component is input to the current mirror circuit.

3. The circuit of claim 1, wherein said winding is a primary winding of a transformer or a winding of a choke coil.

4. A circuit comprising:

a winding having a magnetic member;

input means for conducting an electrical current having an AC component and a DC component, said input means being connected to said winding; and a DC magnetization prevention circuit unit connected to said winding and said input means for substantially preventing DC magnetization of said magnetic member due to the DC component of the electrical current, wherein said DC magnetization prevention circuit unit bypasses almost all of the DC current component from said winding, thereby reducing the DC component flowing through said winding to such a degree that magnetization of said magnetic member due to the DC component of the electrical current is substantially prevented.

5. The circuit of claim 4, wherein said DC magnetization prevention circuit includes:

a current mirror circuit having a diode side circuit connected to one end of said winding and a transistor side circuit connected to the other end of said winding;

a current divider circuit for dividing the electrical current into two current portions and also for supplying one of the current portions to the diode side circuit of said current mirror circuit and the other one of the current portions to the transistor side circuit so that the direct current in the portion flowing from the diode side circuit of the current mirror circuit is substantially smaller in value tha the direct current in the current portion flowing to the transistor side circuit thereof; and a bypass circuit for diverting alternating current from the diode side circuit of said current mirror circuit.

6. The circuit of claim 5, wherein said current divider circuit includes a resistor connected to the diode side and a resistor connected to the transistor side circuit of said current mirror circuit, the resistance value of said resistor connected to the diode side circuit being substantially larger than the resistance value of said resistor connected to the transistor side circuit.

7. The circuit of claim 4, wherein said DC magnetization prevention circuit unit includes:

a transistor connected in shunt with the winding;

a biasing circuit connected in series to the winding for biasing said transistor; and a bypass circuit for bypassing alternating current flowing through said winding so as not to allow the alternating current to flow into said biasing circuit.

8. The circuit of claim 7, wherein said biasing circuit comprises a plurality of resistors connected in series for supplying a bias voltage from a connection point thereof.

9. The circuit of claim 8, wherein said bypass circuit constitutes a filter for reducing leakage of alternating current into the transistor connected in shunt with said winding.

10. The circuit of claim 7, wherein said transistor connected in shunt with said winding is an equivalent transistor obtained by Darlington connection of a plurality of transistors.

11. The circuit of claim 7, wherein said biasing circuit constitutes a filter for reducing leakage of the AC component into the transistor connected in shunt with said winding.

* * * * *